United States Patent
Rusch et al.

(10) Patent No.: US 12,018,699 B2
(45) Date of Patent: Jun. 25, 2024

(54) STABILIZER CHANNEL OF A COMPRESSOR

(71) Applicant: TURBO SYSTEMS SWITZERLAND LTD., Baden (CH)

(72) Inventors: Daniel Bernhard Rusch, Wettingen (CH); Gerd Mundinger, Wettingen (CH)

(73) Assignee: TURBO SYSTEMS SWITZERLAND LTD., Baden (CH)

( * ) Notice: Subject to any disclaimer, the term of this patent is extended or adjusted under 35 U.S.C. 154(b) by 0 days.

(21) Appl. No.: 17/926,654

(22) PCT Filed: May 10, 2021

(86) PCT No.: PCT/EP2021/062336
§ 371 (c)(1),
(2) Date: Mar. 7, 2023

(87) PCT Pub. No.: WO2021/239455
PCT Pub. Date: Dec. 2, 2021

(65) Prior Publication Data
US 2023/0313815 A1   Oct. 5, 2023

(30) Foreign Application Priority Data

May 25, 2020   (EP) .................................... 20176379

(51) Int. Cl.
*F04D 29/66* (2006.01)
*F04D 29/42* (2006.01)
*F04D 29/44* (2006.01)

(52) U.S. Cl.
CPC ....... *F04D 29/661* (2013.01); *F04D 29/4206* (2013.01); *F04D 29/441* (2013.01)

(58) Field of Classification Search
CPC ............. F04D 29/4206; F04D 29/4213; F04D 29/441; F04D 29/661; F04D 29/685
See application file for complete search history.

(56) References Cited

U.S. PATENT DOCUMENTS 4,930,978 A * 6/1990 Khanna ............... F04D 27/0207
  415/914
5,295,785 A * 3/1994 Church ................. F04D 29/685
  415/58.4

(Continued)

FOREIGN PATENT DOCUMENTS

DE       10105456 A1   8/2002
DE    102019216414 A1   8/2020

(Continued)

OTHER PUBLICATIONS

English Translation of International Search Report in International Application No. PCT/EP2021/062336, mailed Jul. 10, 2021, 2 pages.

(Continued)

*Primary Examiner* — Sang K Kim
(74) *Attorney, Agent, or Firm* — Meunier Carlin & Curfman LLC

(57) ABSTRACT

The invention relates to a stabilizer channel having an annular stabilizer chamber which encloses a main flow channel in the intake region of a compressor wheel and is delimited from the main flow channel by an annular bridge. The annular stabilizer channel is connected to the main flow channel via a downstream flow inlet and an upstream flow outlet. At least one separating element (T) is arranged in at least one of the flow inlet and the flow outlet, with the result that an inflow into the annular stabilizer chamber and/or an outflow out of the annular stabilizer chamber are/is split transversely with respect to the main flow direction of the main flow channel. At least one flow guiding element is arranged in at least one of the flow inlet and the flow outlet.

17 Claims, 9 Drawing Sheets

(56) References Cited

U.S. PATENT DOCUMENTS

| | | | | |
|---|---|---|---|---|
| 7,775,759 | B2* | 8/2010 | Sirakov | F04D 29/685 |
| | | | | 415/206 |
| 8,061,974 | B2* | 11/2011 | Gu | F04D 29/685 |
| | | | | 415/58.4 |
| 8,272,832 | B2* | 9/2012 | Yin | F04D 29/685 |
| | | | | 415/206 |
| 8,888,440 | B2* | 11/2014 | Tomita | F04D 27/023 |
| | | | | 415/58.4 |
| 10,935,035 | B2* | 3/2021 | Pelton | F04D 29/681 |
| 2020/0271045 | A1* | 8/2020 | Tomita | F04D 29/284 |

FOREIGN PATENT DOCUMENTS

| | | |
|---|---|---|
| EP | 2434165 A1 | 3/2012 |
| GB | 2220447 A | 1/1990 |

OTHER PUBLICATIONS

European Search Report in European Application No. 20176379.4, dated Oct. 2, 2020, 8 pages.

* cited by examiner (state of the art)

STABILIZER CHANNEL OF A COMPRESSOR

TECHNICAL FIELD

The invention relates to the field of compressors, in particular radial compressors and diagonal compressors. In particular, the invention relates to a stabilizer channel at the compressor inlet for improving the map width and the characteristic curve slope of a compressor stage.

TECHNICAL BACKGROUND

Exhaust turbochargers are used to increase the power of internal combustion engines, in particular reciprocating piston engines. In this context, an exhaust gas turbocharger usually has a radial or diagonal compressor and a radial or axial turbine.

The mobile operating range of radial and diagonal compressors is limited toward smaller mass flows by the surge limit/flow instability: when the compressor is throttled, the incidence angles increasingly deteriorate until the flow separates and surge occurs. The permissible incidence angle range, at which the flow is still in contact, decreases with increasing flow Mach number. This means that the map width tends to decrease in the case of stages with a high pressure ratio and/or high absorption capacity.

As a characteristic curve stabilizing measure, a bypass in the form of an annular cavity within the compressor housing can be provided above the wheel contour of the compressor wheel, parallel to the intake duct. A bypass of this kind is also known as a stabilizer chamber or recirculator. By using a recirculator, the mass flow at the compressor wheel inlet can be artificially increased in the vicinity of the surge limit. Some of the mass flow is diverted from the compressor wheel into the side chamber (bypass). This mass flow has a strong swirl component (in the direction of rotation of the impeller—codirectional swirl). This codirectional swirl leads to a reduction in work conversion in the compressor, which leads to shallow characteristic curves in the vicinity of the surge limit.

In applications with pressure pulsations (e.g. due to the valve movement of the pressure-charged internal combustion engine), shallow characteristic curves in the vicinity of the surge limit can lead to unexpected surge. For this reason, there is a requirement to provide a minimum pressure increase between the operating point and the surge limit point on the operating speed characteristic. This requirement can scarcely be fulfilled in stages with a high pressure ratio and a conventional bypass/stabilizer channel—owing to the high work conversion and the shallow work coefficient curve over the mass flow at constant speed.

BRIEF DESCRIPTION OF THE INVENTION

It is the object of the present invention to provide a stabilizer channel of a compressor, in particular of a radial compressor or diagonal compressor, which is improved at least in respect of one of the disadvantages known from the prior art. Furthermore, it is the object of the present invention to provide an improved compressor and an improved turbomachine, in particular an improved turbocharger.

To achieve the abovementioned objects, a stabilizer channel of a compressor, in particular of a radial compressor or diagonal compressor, as claimed in independent claim 1 is provided. Furthermore, a compressor having a stabilizer channel according to the embodiments described herein and a turbomachine, in particular a turbocharger, having such a compressor are provided.

Further aspects, advantages and features of the present invention can be found in the dependent patent claims, the description and the accompanying figures.

According to one aspect of the invention, a stabilizer channel of a compressor, in particular of a radial compressor or diagonal compressor, is provided. The stabilizer channel comprises an annular stabilizer chamber, which surrounds a main flow channel in the intake region of a compressor wheel. The annular stabilizer chamber is delimited with respect to the main flow channel by an annular web. The annular stabilizer chamber is connected to the main flow channel via a downstream flow inlet and an upstream flow outlet. At least one separating element is arranged in at least one of the flow inlet and the flow outlet, with the result that an inflow into the annular stabilizer chamber and/or an outflow out of the annular stabilizer chamber are/is split transversely with respect to the main flow direction of the main flow channel. Furthermore, at least one flow guiding element is arranged in at least one of the flow inlet and the flow outlet.

Thus, a stabilizer channel is advantageously provided which makes it possible to improve the map width and the characteristic curve slope of a compressor stage. In particular, flow splitting in the flow inlet and/or in the flow outlet in combination with flow guidance, for example by means of flow guiding elements described herein, has the advantage that tip gap vortices in the impeller (e.g. compressor wheel) can be better influenced by virtue of more uniform suction than in the prior art. By means of a suitable arrangement of the separating element in the flow inlet and/or in the flow outlet, the penetration depth of the tip gap vortex can be reduced, in particular when an additional flow guiding element is used, and its orientation can be influenced in a favorable way. In comparison with a conventional configuration without splitting of the inflow into the stabilizer chamber and/or splitting of the outflow from the stabilizer chamber, improved stability and/or a higher efficiency can be achieved with the embodiments described herein.

According to a second aspect of the invention, a compressor, in particular a radial compressor or a diagonal compressor, is provided which comprises a compressor wheel and a stabilizer channel according to one of the embodiments described herein. In particular, the compressor wheel comprises, in the region of the flow inlet into the stabilizer channel, a number $N_1$ of compressor wheel blades and a number $N_2$ of guiding elements of the at least one flow guiding element, wherein the number $N_2$ is $\geq 1.5 \times N_1$.

Thus, a compressor having improved characteristic map width and characteristic curve slope, in particular having reduced noise and vibration generation during operation of the compressor, can advantageously be provided.

A third aspect of the invention relates to a turbomachine, in particular a turbocharger, having a compressor according to one of the embodiments described herein, and therefore a turbocharger which is improved over the prior art is advantageously provided.

BRIEF DESCRIPTION OF THE FIGURES

The invention will be explained below with reference to exemplary embodiments, which are illustrated in the figures and from which further advantages and modifications can be derived. Here.

DETAILED DESCRIPTION OF THE FIGURES

There now follows a detailed description of the various embodiments, one or more examples of which are illustrated in each figure. Each example is for explanatory purposes and should not be interpreted as restrictive. For example, features illustrated or described as part of one embodiment may be used on or in conjunction with any other embodiment to obtain a further embodiment. The intention is that the present disclosure should include such modifications and variations.

In the following description of the drawings, the same reference numbers refer to the same or similar components. In general, only the differences with respect to the individual embodiments are described. Unless stated otherwise, the description of a part or aspect in one embodiment can also relate to a corresponding part or corresponding aspect in another embodiment.

Figure 1:
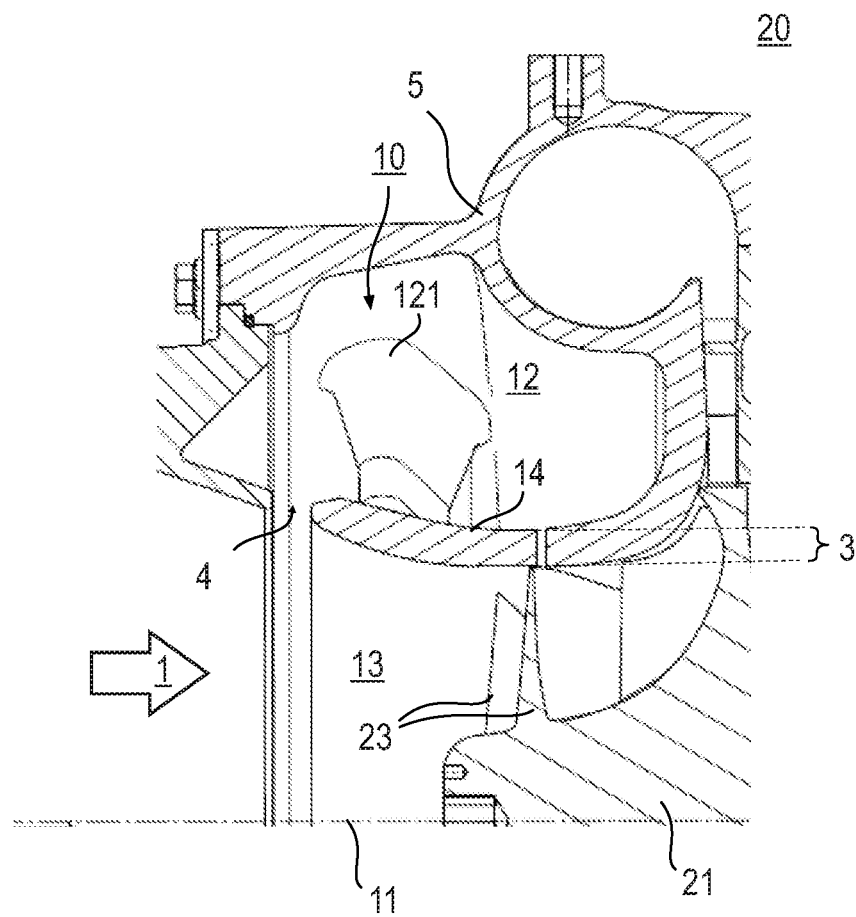
FIG. 1 shows a schematic view of a stabilizer channel according to the prior art.

FIG. 1 shows a schematic view of a stabilizer channel 10 according to the prior art. In particular, FIG. 1 shows a section taken along the axis of rotation 11 of the compressor wheel 21 through a housing of a radial compressor of the kind used, for example, for compressing air in exhaust gas turbochargers. A stabilizer chamber 12 is arranged in the compressor housing 5. The stabilizer chamber 12 is connected to the main flow channel 13 via an inlet channel 3 and an outlet opening 4. The stabilizer chamber 12 is delimited with respect to the main flow channel 13 by means of an annular web 14. Arranged in the stabilizer chamber 12 are holding ribs 121, which connect the annular web 14 to the compressor housing.

Embodiments of a stabilizer channel of a compressor according to the present disclosure are described with reference to FIGS. 2 to 10. The compressor can be a radial compressor or a diagonal compressor.

Figure 2:
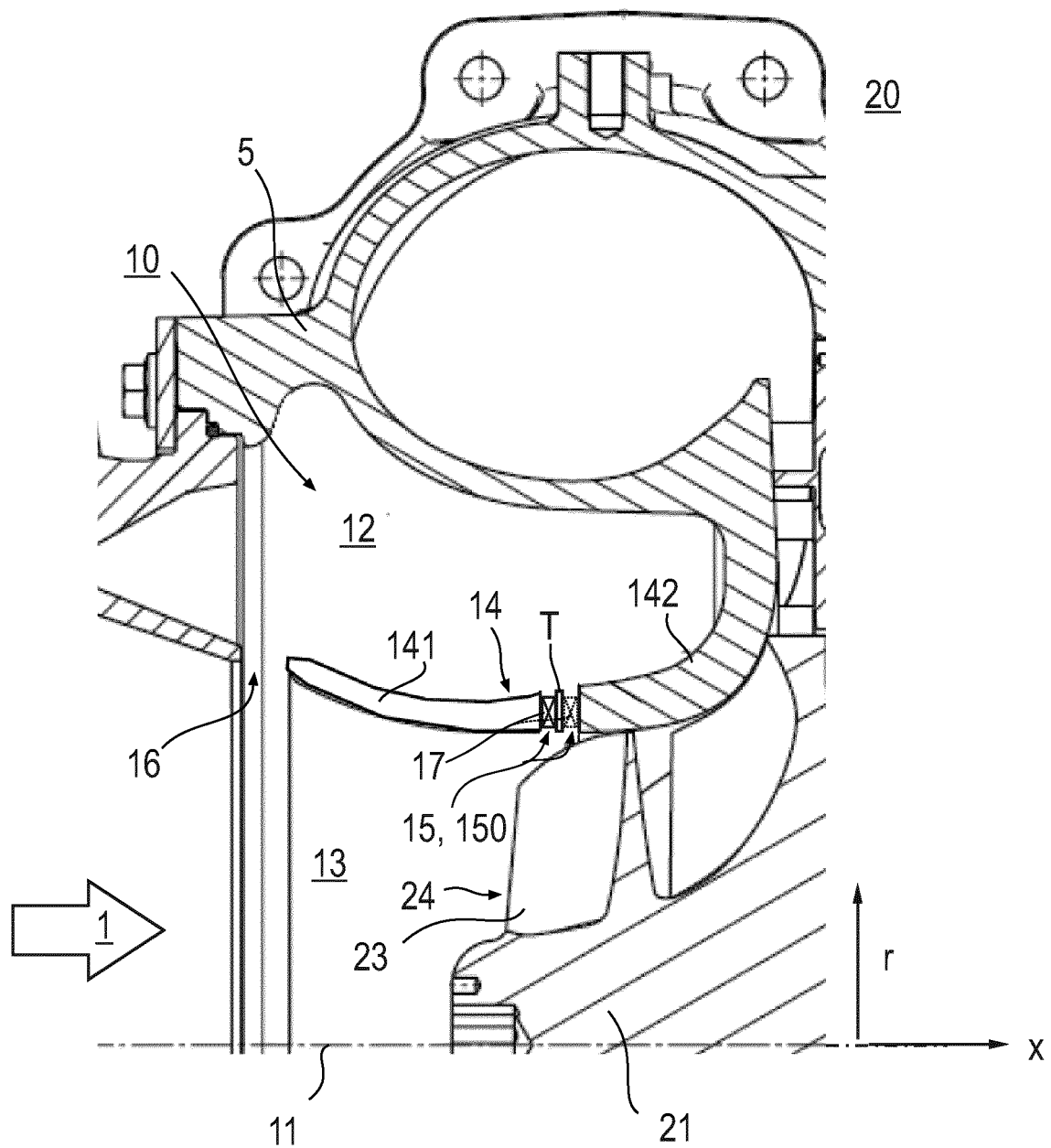
FIG. 2 shows a schematic view of a stabilizer channel according to embodiments described herein.
Figure 3A:
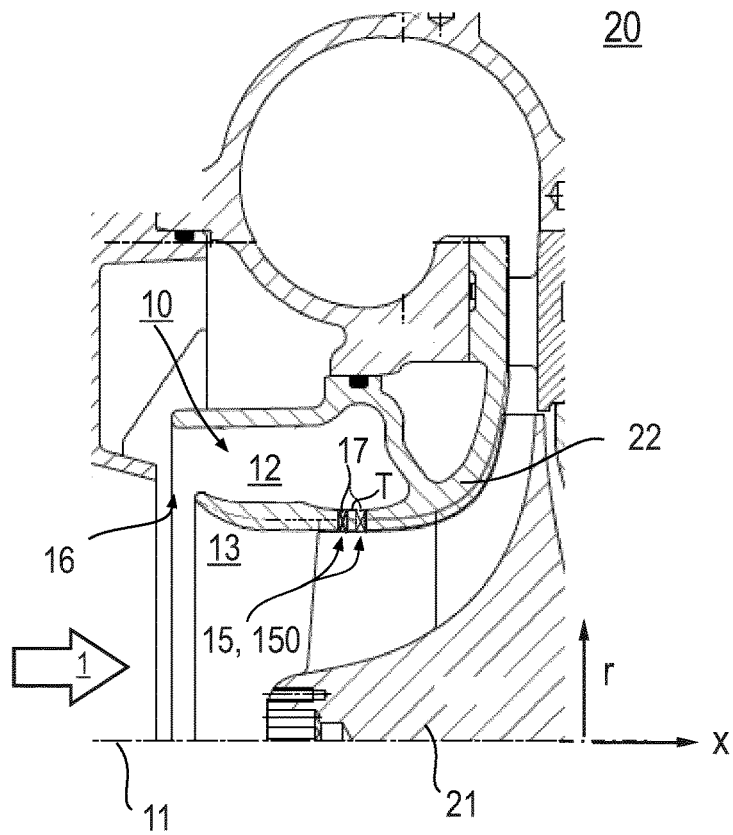
FIG. 3a shows a schematic view of a stabilizer channel according to further embodiments described herein, wherein the stabilizer channel is integrated into an insert.
Figure 3B:
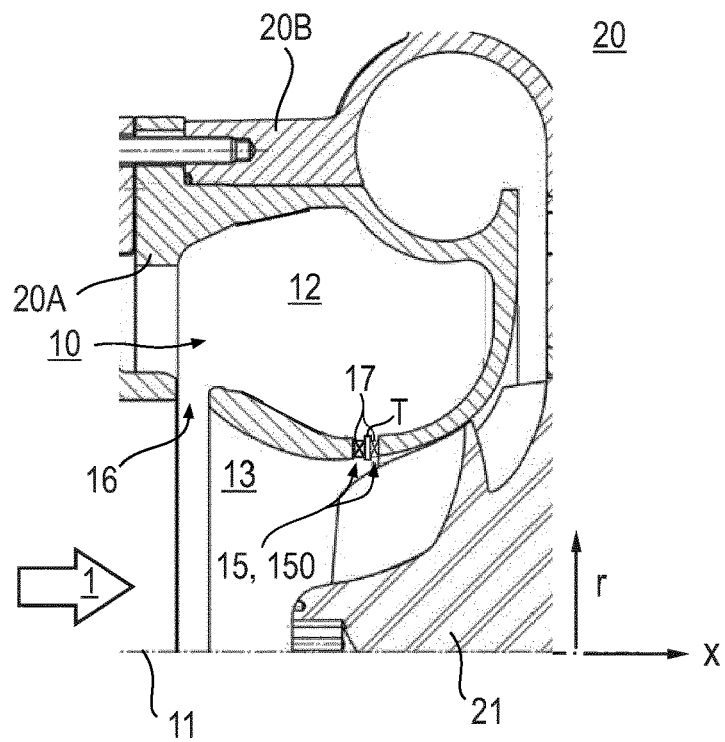
FIG. 3b shows a schematic view of a stabilizer channel according to further embodiments described herein, wherein the stabilizer channel is part of a compressor inner housing.

According to one embodiment, which can be combined with other embodiments described herein, the stabilizer channel 10 comprises an annular stabilizer chamber 12, which surrounds a main flow channel 13 in the intake region of a compressor wheel 21, as illustrated by way of example in FIG. 2. In other words, the stabilizer channel 10 is typically arranged at the compressor inlet. In this context, it should be noted that in the present disclosure, a "stabilizer channel" should be understood, in particular, to mean a channel in the compressor inlet which is configured to improve a map width of a compressor stage. For example, the stabilizer channel 10 can be a recirculation channel.

The annular stabilizer chamber 12 is delimited with respect to the main flow channel 13 by an annular web 14. The annular stabilizer chamber 12 is connected to the main flow channel 13 via a downstream flow inlet 15 and an upstream flow outlet 16. The annular stabilizer chamber 12 can be of rotationally symmetrical design.

Figure 8A:
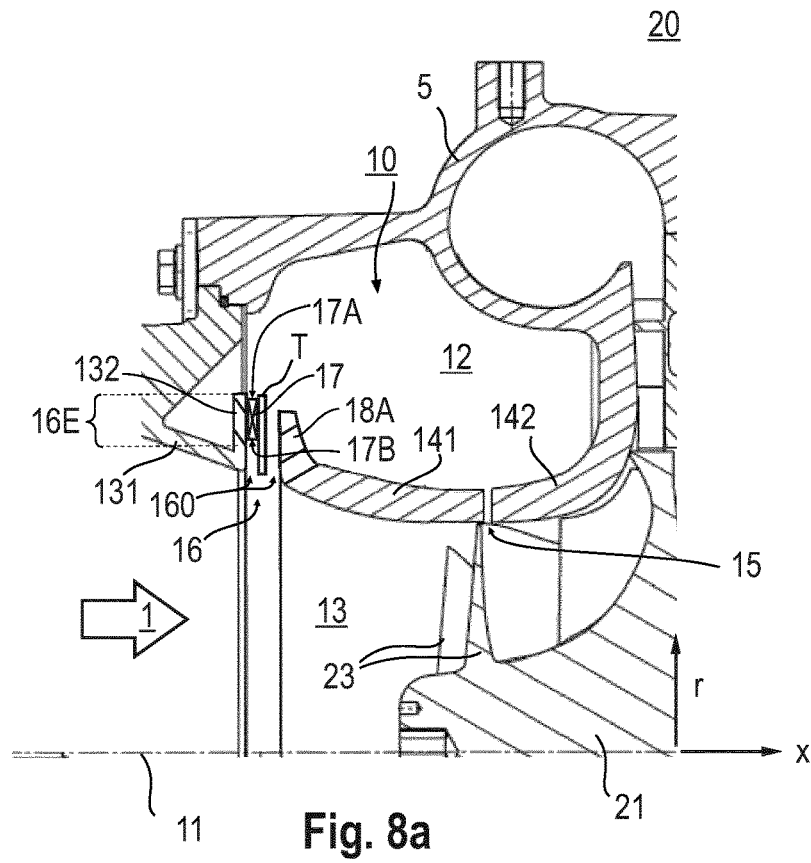
Figure 8B:
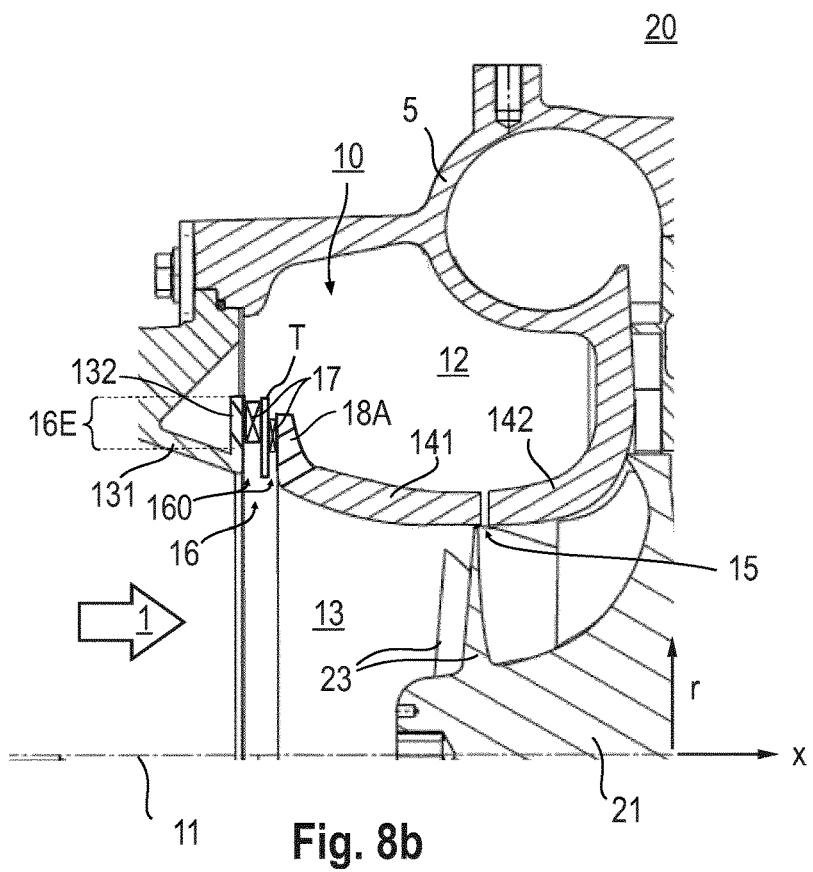

At least one separating element T is arranged in at least one of the flow inlet 15 and the flow outlet 16. FIG. 2 shows an exemplary embodiment with a separating element T which is arranged in the flow inlet 15 into the annular stabilizer chamber 12. An exemplary embodiment with a separating element T which is arranged in the flow outlet 16 from the annular stabilizer chamber 12, is illustrated in FIGS. 8a and 8b.

The separating element is arranged in such a way that an inflow into the annular stabilizer chamber 12 and/or an outflow from the annular stabilizer chamber 12 is split transversely with respect to the main flow direction 1 of the main flow channel 13. In other words, the separating element T is configured and arranged so that a flow is divided. For example, the at least one separating element T can be configured and arranged in the flow inlet 15 in such a way that an inflow into the stabilizer chamber 12 is divided. Alternatively or additionally, the at least one separating element T can be configured and arranged in the flow outlet 16 in such a way that an outflow from the stabilizer chamber 12 is divided. Typically, the separating element is embodied in the form of a dividing wall which has a continuous dividing wall surface. Alternatively, the separating element, in particular the dividing wall, can have one or more holes, with the result that the dividing wall surface is partially interrupted.

Furthermore, at least one flow guiding element 17 as illustrated by way of example in FIG. 2 is arranged in at least one of the flow inlet 15 and the flow outlet 16. The at least one flow guiding element 17 can be in the form of a spiral, for example. Typically, the at least one flow guiding element 17 comprises a plurality of flow guiding elements, which are arranged circumferentially around a central axis 11 of the main flow channel 13. In particular, the plurality of flow guiding elements 17 can be arranged concentrically around the central axis 11 of the main flow channel 13.

In the present disclosure, the terms "downstream" and "upstream" refer to the main flow in the main flow channel in the intake region of a compressor wheel. For better understanding, the main flow direction 1 has been entered on the figures. According to one example, the flow inlet 15 of the stabilizer chamber can be arranged downstream of an inlet edge 24 of the compressor wheel 21, as shown in FIG. 2. The flow outlet 16 of the stabilizer chamber is typically arranged upstream of the inlet edge 24 of the compressor wheel 21.

According to one embodiment, which can be combined with other embodiments described herein, the stabilizer channel 10 is an integral part of a compressor housing, as illustrated by way of example in FIG. 2. Alternatively, the stabilizer channel 10 can be integrated into an insert 22, which can be mounted in the intake region of a compressor, as illustrated by way of example in FIG. 3a. According to another example, the stabilizer channel can be part of a compressor inner housing 20A, as illustrated by way of example in FIG. 3b, in which a compressor 20 having a compressor inner housing 20A and a compressor outer housing 20B is shown.

According to one embodiment, which can be combined with other embodiments described herein, the at least one separating element T is arranged in the flow inlet 15 in such a way that two or more downstream inlet channels 150 are provided, as illustrated by way of example in FIGS. 2 to 7. As can be seen from FIGS. 2 to 7, the two or more downstream inlet channels 150 are spaced apart axially.

Figure 4:
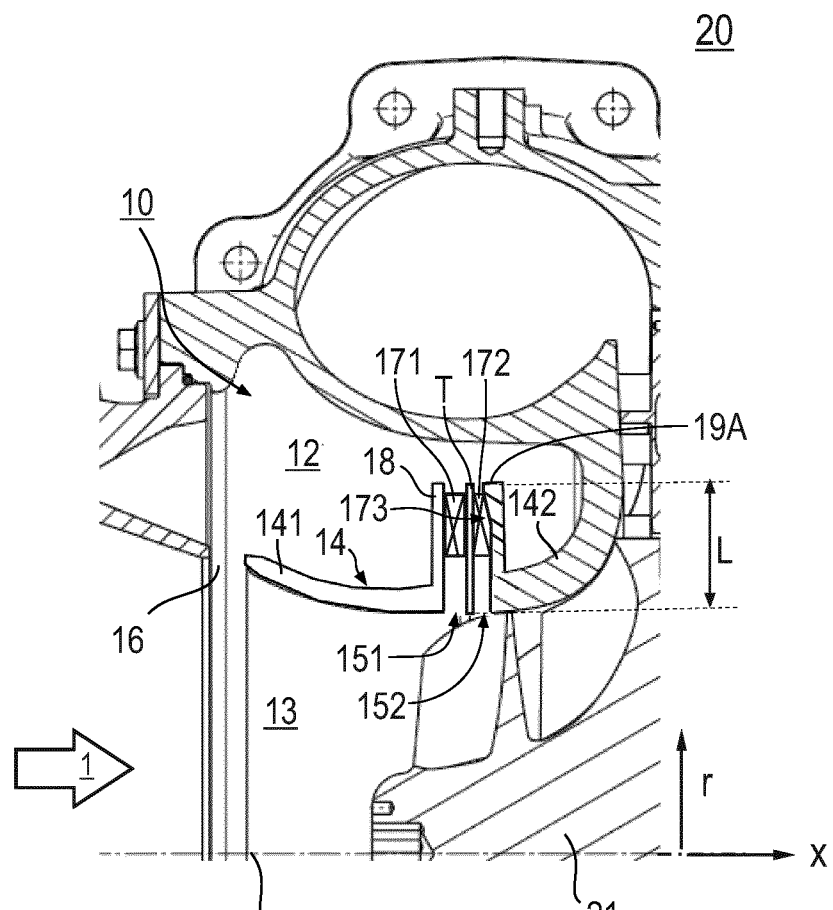
FIGS. 4 to 8 show schematic views of a stabilizer channel according to further embodiments described herein
Figure 5A:
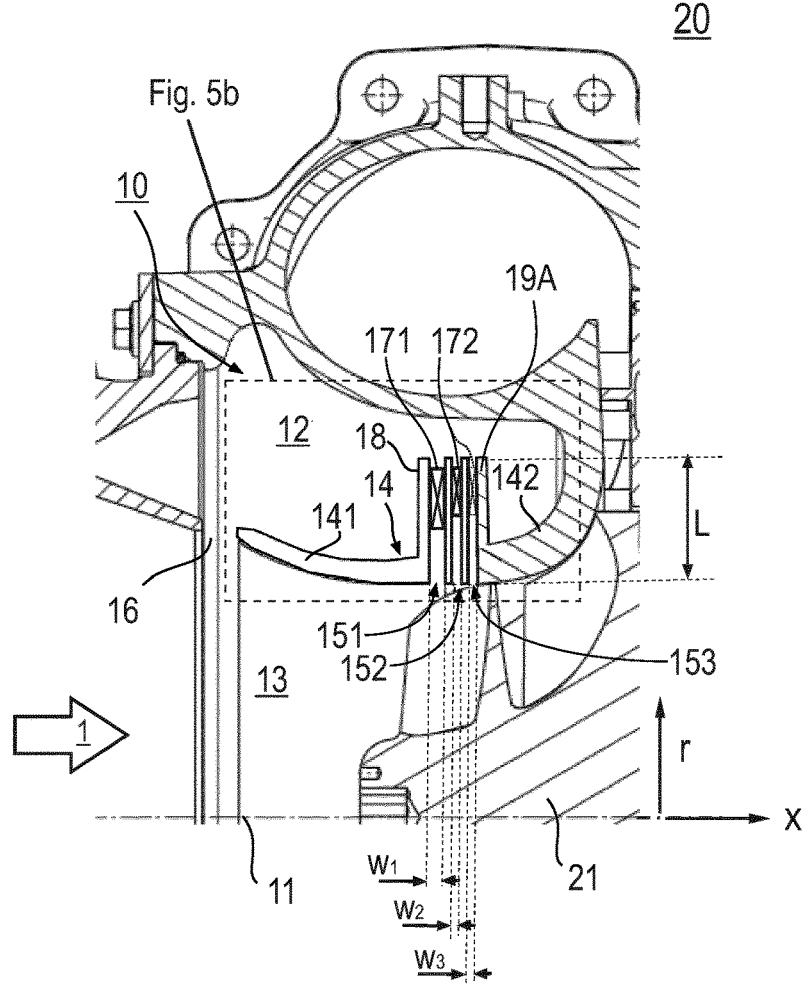

For example, at least one inlet channel of the two or more downstream inlet channels 150 can be designed differently than the other inlet channel or channels, as illustrated by way of example in FIGS. 4, 5a, 5b and 7. In particular, at least one inlet channel of the two or more downstream inlet channels differs from the other inlet channel or channels in respect of the channel width and/or the channel shape. For example, the at least one inlet channel can have a smaller inlet channel width than the other inlet channel or channels of the two or more downstream inlet channels. For illustration, FIG. 5a shows an exemplary embodiment with three inlet channels 151, 152, 153 with different channel widths $w_1$, $w_2$ and $w_3$. Alternatively or additionally, the at least one inlet channel can have a cross-sectional taper in the radial direction. For illustration, the second inlet channel 152 is illustrated in FIG. 4 with a cross-sectional taper 173. Attention is drawn to the fact that the two or more downstream inlet channels 150 can also be of identical configuration.

In the present disclosure, the term "inlet channel" should be understood to mean a channel which serves as a flow inlet channel into the stabilizer chamber. Typically, an inlet channel 150 described herein comprises an inlet opening 15A on the main flow channel side and an outlet opening 15B on the stabilizer chamber side, as illustrated by way of example in FIGS. 5b and 7.

According to one embodiment, which can be combined with other embodiments described herein, at least one flow guiding element 17 is arranged in each of at least two of the two or more downstream inlet channels 150. For example, the at least one flow guiding element 17 can be designed differently in one inlet channel of the two or more downstream inlet channels 150 than in another inlet channel of the two or more downstream inlet channels 150, in particular in respect of number and/or shape. For illustration, FIG. 5a shows a first group of flow guiding elements 171 in a first inlet channel 151 and in each case a second group of flow guiding elements 172 in a second inlet channel 152 and a third inlet channel 153.

According to one embodiment, which can be combined with other embodiments described herein, the two or more downstream inlet channels 150 extend substantially in the radial direction. In the present disclosure, the term "substantially radially" should be understood to mean an angular range of $-45° \leq \alpha \leq 45°$ or less, in particular of $-25° \leq \alpha \leq 25°$ or less, relative to the radial direction r. As illustrated by way of example in the figures, the radial direction r extends perpendicularly to the central axis 11. According to one example, "substantially radially" should be understood to mean an angular range of $\pm 10°$ or less relative to the radial direction r. For better understanding, inlet channels 150 which are inclined by an angle $\alpha$ and fall within the definition of "substantially radially" given above are shown by way of example in FIG. 6. The angle $\alpha$ is in the x-r plane.

Figure 7:
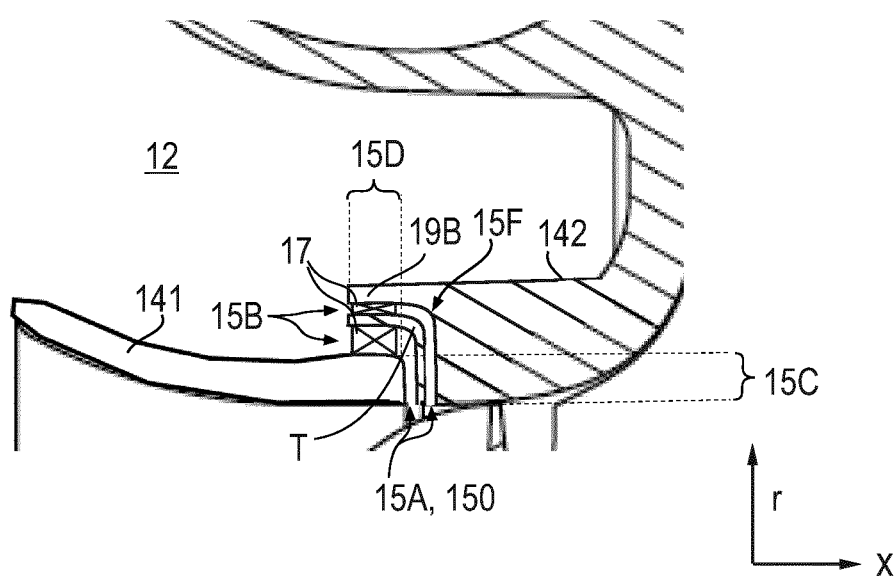

According to one embodiment, which can be combined with other embodiments described herein, the two or more downstream inlet channels 150 can comprise a substantially radially extending part 15C and a substantially axially extending part 15D, as illustrated by way of example in FIG. 7. There is typically a curved transition region 15F between the substantially radially extending part 15C and the substantially axially extending part 15D.

According to one embodiment, which can be combined with other embodiments described herein, the two or more downstream inlet channels 150 are arranged between an upstream part 141 of the annular web 14 and a downstream part 142 of the annular web 14, as illustrated by way of example in FIG. 2. The upstream part 141 of the annular web 14 can have a first extension 18 extending substantially in the radial direction, as shown by way of example in FIG. 4. The downstream part 142 of the annular web 14 can comprise a second extension 19A extending substantially in the radial direction. Alternatively or additionally, the downstream part 142 of the annular web 14 can comprise a second extension 19B extending substantially in the axial direction, as illustrated, for example, in FIG. 7.

Figure 5B:
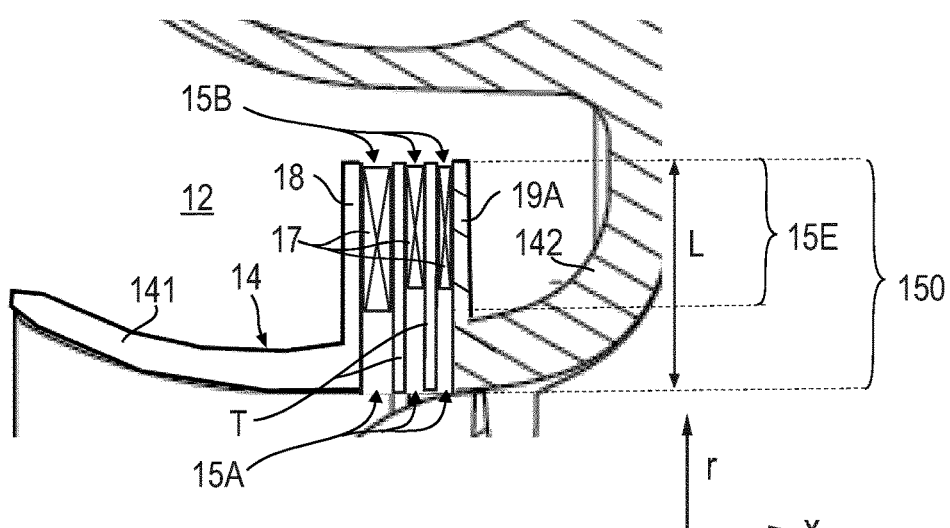
Figure 6:
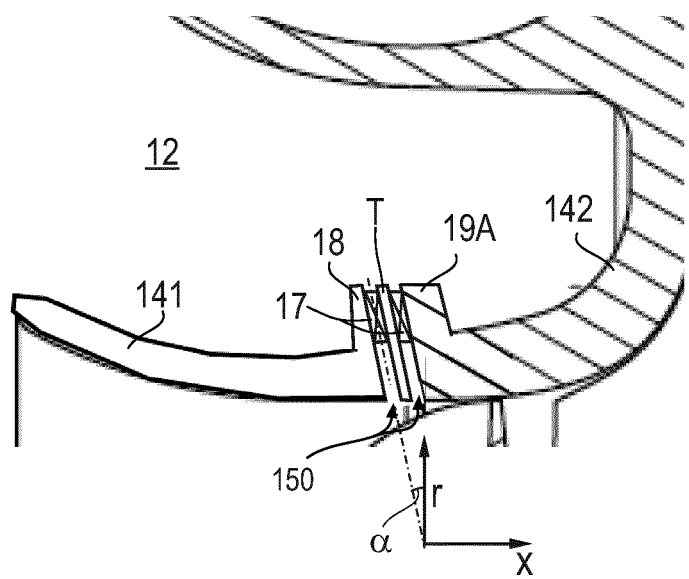

According to one embodiment, which can be combined with other embodiments described herein, the at least one flow guiding element 17 is arranged in at least one outflow region 15E of the two or more inlet channels 150 of the stabilizer chamber, as shown by way of example in FIG. 5b.

The outflow region of an inlet channel 150 described herein should be understood to mean the region of the inlet channel 150 which is located on the same side as the outlet opening 15B on the stabilizer chamber side. The outflow region can extend over half the inlet channel length L or less, for example. For better understanding, the outflow region 15E of the inlet channel 15 is illustrated by way of example in FIG. 5b. Arrangement of the at least one flow guiding element 17 in an outflow region of the inlet channel can have a favorable effect on flow losses and blade oscillation excitation.

According to one embodiment, which can be combined with other embodiments described herein, the at least one separating element T is arranged in the upstream flow outlet 16. In particular, the at least one separating element T is arranged in the upstream flow outlet 16 in such a way that two or more upstream outlet channels 160 are provided.

As illustrated in FIGS. 8a and 8b, the two or more upstream outlet channels 160 are spaced apart axially. Furthermore, at least one outlet channel of the two or more upstream outlet channels 160 can be designed differently than the other outlet channel or channels. In particular, at least one outlet channel of the two or more upstream outlet channels 160 differs from the other outlet channel or channels in respect of the channel width and/or the channel shape. For example, the at least one outlet channel can have a smaller outlet channel width than the other outlet channel or channels of the two or more upstream outlet channels. Attention is drawn to the fact that the two or more upstream outlet channels 160 can also be of identical configuration.

According to one embodiment, which can be combined with other embodiments described herein, at least one flow guiding element 17 is arranged in each of at least two of the two or more upstream outlet channels 160, as illustrated by way of example in FIG. 8b. For example, the at least one flow guiding element 17 can be designed differently in one of the two or more upstream outlet channels 160 than in another of the two or more upstream outlet channels 160, in particular in respect of number and/or shape.

According to one embodiment, which can be combined with other embodiments described herein, the two or more upstream outlet channels 160 extend substantially in the radial direction.

According to one embodiment, which can be combined with other embodiments described herein, the two or more upstream outlet channels 160 are arranged between a main flow channel wall 131 and an upstream part 141 of the annular web 14, as illustrated by way of example in FIGS. 8a and 8b. In particular, the two or more upstream outlet channels 160 are arranged between a third extension 18A, extending substantially in the radial direction, of the upstream part 141 of the annular web 14 and an extension 132, extending substantially in the radial direction, of the main flow channel wall 131.

According to one embodiment, which can be combined with other embodiments described herein, the at least one flow guiding element 17 is arranged in at least one inflow region 16E of the two or more outlet channels 160 of the stabilizer chamber, as illustrated by way of example in FIG. 8b.

The outflow region 16E of an outlet channel 160 described herein should be understood to mean the region of the outlet channel 160 which is located on the same side as the stabilizer chamber 12. The inflow region 16E can extend over half the outlet channel length or less, for example.

According to one embodiment, which can be combined with other embodiments described herein, the at least one flow guiding element 17 is designed and arranged in order to provide a deflecting grid through which flow can occur. The deflecting grid through which flow can occur can be a deflecting grid through which flow can occur substantially radially.

According to an alternative embodiment, which can be combined with other embodiments described herein, the at least one flow guiding element 17 is designed and arranged in such a way as to provide a deflecting grid through which flow can occur substantially axially, as shown by way of example in FIG. 7. In the present disclosure, the term "substantially axially" should be understood to mean an angular range of ±45° or less, in particular of ±25° or less, relative to the axial direction x. As illustrated by way of example in FIG. 7, the axial direction x extends along the central axis 11. According to one example, "substantially axially" should be understood to mean an angular range of ±10° or less relative to the axial direction x. A deflecting grid through which flow can occur substantially axially can be provided, for example, by a configuration of the inlet channels 150 of the stabilizer chamber and an arrangement of the at least one flow guiding element 17 according to FIG. 7.

According to one embodiment, which can be combined with other embodiments described herein, at least one flow guiding element of the at least one flow guiding elements 17 is embodied as a separate component.

According to one embodiment, which can be combined with other embodiments described herein, at least one flow guiding element of the at least one flow guiding elements 17 is formed integrally (in one piece) with at least one adjacent component. As can be seen from the figures, the components adjacent to the at least one flow guiding element 17 are the separating element T, the upstream part 141 of the annular web 14, in particular with the first extension 18 and/or the third extension 18A, the downstream part 142 of the annular web 14, in particular with the second extension 19A or 19B, and the main flow channel wall 131, in particular with the extension 132.

According to one embodiment, which can be combined with other embodiments described herein, at least one, in particular at least half or all, of the plurality of flow guiding elements 17 is/are formed from Curtis-type blade profiles. In particular, at least one, in particular at least half or all, of the plurality of flow guiding elements 17 can be prismatic, Curtis-type blades. Typically, the flow guiding elements 17 are designed as radial deflecting blades. Embodiment of the flow guiding elements from Curtis-type blade profiles, in particular flow guiding elements in the form of prismatic Curtis-type blades, has the advantage that these can be made relatively thick, making possible a better connection of the flow guiding elements 17 to the adjacent components, for example by means of screwed joints or other suitable types of joint specified herein.

According to one embodiment, which can be combined with other embodiments described herein, the downstream part 142 of the annular web 14 has a centering shoulder, in particular a cylindrical or conical centering shoulder. Alternatively or additionally, the separating element T can have a centering shoulder, in particular a cylindrical or conical centering shoulder. Alternatively or additionally, the upstream part 141 of the annular web 14 can have a centering shoulder, in particular a cylindrical or conical centering shoulder.

According to one embodiment, which can be combined with other embodiments described herein, the upstream part 141 of the annular web 14 and the downstream part 142 of the annular web 14 are connected via the at least one flow guiding element 17, in particular via a plurality of flow guiding elements 17 and the separating element T, for example by means of a screwed joint or pinned joint. The screwed joint or pinned joint can extend through the at least one flow guiding element 17, in particular through one or more flow guiding elements 17 and the separating element T. It should be noted that the screwed joints or pinned joints can also be embodied in some other way, i.e. in such a way that they do not extend through the at least one flow guiding element 17 or the separating element T. Alternatively or additionally, it is also possible to use other types of connection, such as shrinking or clamping.

According to one embodiment, which can be combined with other embodiments described herein, the at least one flow guiding element 17 has a centering seat, which is designed for arrangement of the at least one flow guiding element 17 circumferentially, in particular concentrically, around the central axis 11 of the main flow channel 13 in the downstream flow inlet 15, in particular in one or more downstream inlet channels. Alternatively or additionally, the at least one flow guiding element 17 has a centering seat, which is designed for arrangement of the at least one flow guiding element 17 circumferentially, in particular concentrically, around the central axis 11 of the main flow channel 13 in the upstream flow outlet 16, in particular in one or more upstream outlet channels. The centering seat can be implemented, for example, by means of one or more centering elements, one or more centering pins, or a centering edge on the components to be centered.

Figure 9A:
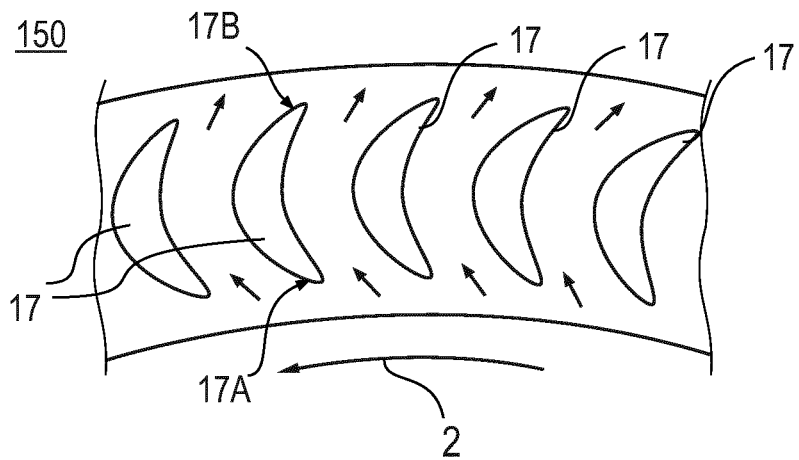
FIG. 9a shows a schematic view of a configuration of flow guiding elements in a downstream inlet channel for generating a flow counter-swirl during flow through the guiding elements.
Figure 9B:
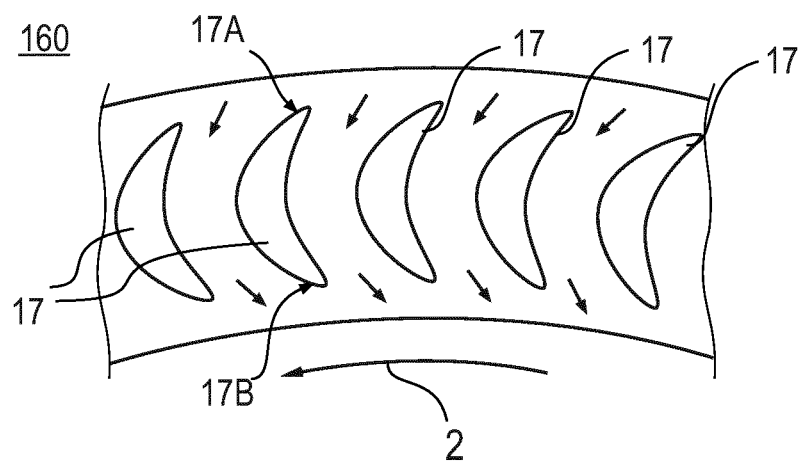
FIG. 9b shows a schematic view of a configuration of flow guiding elements in an upstream outlet channel for generating a flow counter-swirl during flow through the guiding elements.
Figure 10A:
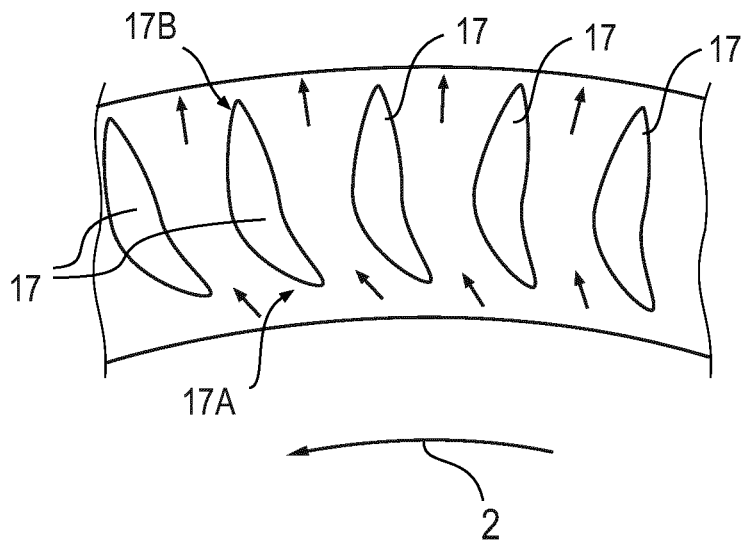
FIG. 10a shows a schematic view of a configuration of flow guiding elements in a downstream inlet channel for reducing a flow swirl during flow through the guiding elements.
Figure 10B:
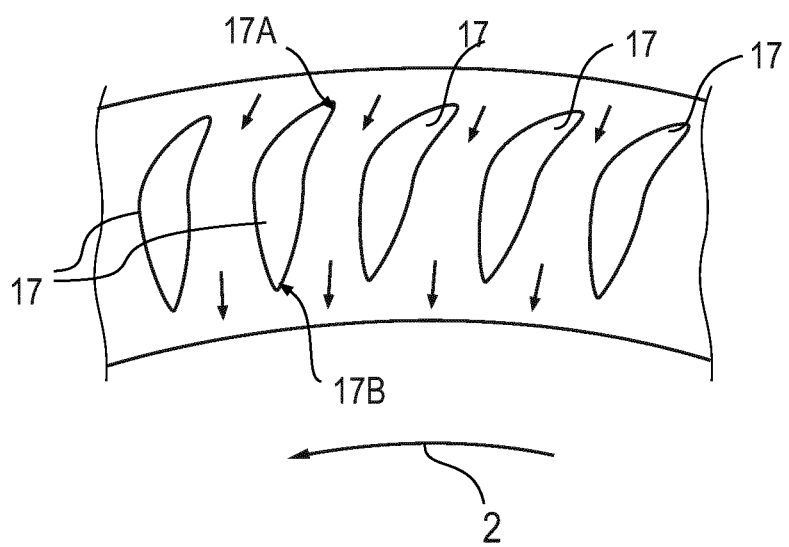
FIG. 10b shows a schematic view of a configuration of flow guiding elements in an upstream outlet channel for reducing a flow swirl during flow through the guiding elements.

According to one embodiment, which can be combined with other embodiments described herein, the at least one flow guiding element 17 has an inflow end 17A and an outflow end 17B. The downstream end of the at least one flow guiding element 17 can be inclined in the circumferential direction relative to the inflow end 17A of the at least one flow guiding element 17, thus ensuring that a swirl is reduced or a counter-swirl is generated during through flow. For explanation, FIGS. 9a and 10a illustrate sections of a downstream inlet channel 150 with a plurality of flow guiding elements 17, wherein the direction of rotation 2 of the compressor wheel which leads to a flow subject to swirl is depicted. FIG. 9a shows a configuration of the flow guiding elements 17 with which a counter-swirl can be generated during through flow, as illustrated by way of example by the arrows between the inflow ends 17A and the outflow ends 17B in FIG. 9a. FIG. 9b shows a schematic view of a configuration of flow guiding elements 17 in an upstream outlet channel 160 for generating a flow counter-swirl during flow through the guiding elements. FIG. 10a shows a configuration of the flow guiding elements 17 in a downstream inlet channel 150, by means of which a swirl can be reduced during through flow. FIG. 10b shows a schematic view of a configuration of flow guiding elements 17 in an upstream outlet channel 160 for reducing a flow swirl during flow through the guiding elements.

It should furthermore be noted that the flow guiding elements 17 can be embodied flush with the inlet opening, located on the main flow channel side, of an inlet channel 150 described herein and/or flush with the outlet opening, located on the stabilizer chamber side, of an inlet channel 150 described herein. Alternatively, the flow guiding elements 17 can be spaced apart from the inlet opening, located on the main flow channel side, of an inlet channel 150 described herein and/or from the outlet opening, located on the stabilizer chamber side, of an inlet channel 150 described herein.

In a similar manner, the flow guiding elements 17 can be embodied to be flush with the outlet opening, located on the main flow channel side, of an outlet channel 160 described herein and/or to be flush with the inlet opening, located on the stabilizer chamber side, of an outlet channel 160 described herein. Alternatively, the flow guiding elements 17 can be spaced apart from the outlet opening, located on the main flow channel side, of an outlet channel 160 described herein and/or from the inlet opening, located on the stabilizer chamber side, of an outlet channel 160 described herein.

According to one embodiment, which can be combined with other embodiments described herein, the annular stabilizer chamber 12 is free from blades. In other words, no blades, in particular no flow guide blades, are arranged in the annular stabilizer chamber 12. In particular, the annular stabilizer chamber 12 can also be free from struts. In other words, the annular stabilizer chamber 12 can be free from blades and free from struts, and therefore there are neither flow guide blades nor struts in the annular stabilizer chamber 12.

According to a second aspect of the present disclosure, a compressor 20, in particular a radial compressor or a diagonal compressor, is provided which comprises a compressor wheel 21 and a stabilizer channel 10 according to one of the embodiments described herein. According to one embodiment, which can be combined with other embodiments described herein, the compressor wheel 21 comprises, in the region of the flow inlet 15, a number $N_1$ of compressor wheel blades 23 and a number $N_2$ of guiding elements of the at least one flow guiding element 17 of $N_2 \geq 1.5 \times N_1$.

Thus, a compressor having improved characteristic map width and characteristic curve slope, in particular having reduced noise and vibration generation during operation of the compressor, can advantageously be provided.

A third aspect of the invention relates to a turbomachine, in particular a turbocharger, having a compressor according to one of the embodiments described herein, and therefore a turbomachine, in particular a turbocharger, which is improved over the prior art is advantageously provided.

LIST OF REFERENCE SIGNS

1 main flow direction
2 direction of rotation of the compressor wheel
3 inlet channel according to the prior art
4 outlet opening according to the prior art
5 compressor housing
10 stabilizer channel
11 central axis/axis of rotation of the compressor wheel
12 annular stabilizer chamber
121 strut
13 main flow channel
131 main flow channel wall
132 extension of the main flow channel wall
14 annular web
141 upstream part of the annular web
142 downstream part of the annular web
15 downstream flow inlet of the stabilizer chamber
150 two or more downstream inlet channels
151 first inlet channel
152 second inlet channel
153 third inlet channel
15A inlet opening, located on the main flow channel side, of the two or more inlet channels
15B outlet opening, located on the stabilizer chamber side, of the two or more inlet channels
15C substantially radially extending part of the two or more inlet channels
15D substantially axially extending part of the two or more inlet channels
15E outflow region of the two or more inlet channels
15F transition region of the two or more inlet channels
16 upstream flow outlet of the stabilizer chamber
16E inflow region of the two or more outlet channels
160 two or more upstream outlet channels
17 at least one flow guiding element/flow guiding elements
171 first group of flow guiding elements
172 second group of flow guiding elements
173 cross-sectional taper
17A inflow end of the flow guiding elements
17B outflow end of the flow guiding elements
18 first extension extending substantially in the radial direction
18A third extension extending substantially in the radial direction
19A second extension extending substantially in the radial direction
19B second extension extending substantially in the axial direction
20 compressor
20A compressor inner housing
20B compressor outer housing
21 compressor wheel
22 insert
23 compressor wheel blades
24 inlet edge of the compressor wheel
T separating element
r radial direction
x axial direction
L length of the two or more inlet channels of the stabilizer chamber
$w_1$ channel width of the first inlet channel
$w_2$ channel width of the second inlet channel $w_3$ channel width of the third inlet channel α angle in the x-r-plane for explanation of "substantially radially"

The invention claimed is:

1. A stabilizer channel of a compressor having an annular stabilizer chamber, which surrounds a main flow channel in the intake region of a compressor wheel and is delimited with respect to the main flow channel by an annular web, the annular web having a first surface that defines a portion of the annular stabilizer chamber, wherein the annular stabilizer chamber is connected to the main flow channel via a downstream flow inlet and an upstream flow outlet, wherein at least one separating element (T) is arranged in at least one of the flow inlet and the flow outlet, with the result that an inflow into the annular stabilizer chamber and/or an outflow out of the annular stabilizer chamber are/is split transversely with respect to the main flow direction of the main flow channel, and wherein at least one flow guiding element is arranged in at least one of the flow inlet and the flow outlet, wherein the at least one flow guiding element is configured such that a swirl is reduced or a counter-swirl is generated during flow through at least one of the flow inlet and the flow outlet, wherein the at least one separating element (T) is configured and arranged in the flow inlet in such a way that the inflow into the annular stabilizer chamber is divided into two or more downstream inlet channels, and wherein the two or more downstream inlet channels are arranged between an upstream part of the annular web and a downstream part of the annular web, wherein the upstream part of the annular web comprises a first extension and the downstream part of the annular web comprises a second extension, wherein the first extension and the second extension extend away from the first surface of the annular web in the radial direction and into the annular stabilizer chamber.

2. The stabilizer channel as claimed in claim 1, wherein at least one inlet channel of the two or more downstream inlet channels is of different design in respect of at least one of the channel width and the channel shape.

3. The stabilizer channel as claimed in claim 1, wherein the at least one separating element (T) is arranged in the flow inlet in such a way that two or more downstream inlet channels are provided, wherein at least one flow guiding element is arranged in each of at least two of the two or more downstream inlet channels.

4. The stabilizer channel as claimed in claim 2, wherein the two or more downstream inlet channels extend substantially in the radial direction.

5. The stabilizer channel as claimed in claim 1, wherein the at least one flow guiding element is arranged in at least one outflow region of the two or more inlet channels of the stabilizer chamber.

6. The stabilizer channel as claimed in claim 1, wherein the at least one flow guiding element is designed and arranged in order to provide a deflecting grid through which flow can occur at least one of substantially radially and substantially axially.

7. The stabilizer channel as claimed in claim 1, wherein at least one of the at least one flow guiding elements is embodied as a separate component.

8. The stabilizer channel as claimed in claim 1, wherein at least one of the at least one flow guiding elements is formed integrally with at least one adjacent component.

9. The stabilizer channel as claimed in claim 1, wherein at least one of the downstream part of the annular web, the separating element (T) and the upstream part of the annular web have a centering shoulder.

10. The stabilizer channel as claimed in claim 9, wherein the centering shoulder is a cylindrical or conical centering shoulder.

11. The stabilizer channel as claimed in claim 1, wherein the at least one flow guiding element has an inflow end and an outflow end, wherein the outflow end is inclined in the circumferential direction relative to the inflow end, thus ensuring that a swirl is reduced or a counter-swirl is generated during through flow.

12. The stabilizer channel as claimed in claim 1, wherein the at least one inlet channel has a smaller inlet channel width than the other inlet channel or channels of the two or more downstream inlet channels.

13. The stabilizer channel as claimed in claim 1, wherein the at least one inlet channel has a cross-sectional taper in the radial direction.

14. The stabilizer channel as claimed in claim 1, wherein the compressor is a radial compressor or a diagonal compressor.

15. The stabilizer channel as claimed in claim 1, wherein the at least one flow guiding element is designed differently in one of the two or more downstream inlet channels than in another of the two or more downstream inlet channels in respect of at least one of number and shape.

16. A compressor having a compressor wheel and a stabilizer channel as claimed in claim 1, wherein the compressor wheel comprises, in the region of the flow inlet into the stabilizer channel, a number $N_1$ of compressor wheel blades and a number $N_2$ of guiding elements of the at least one flow guiding element, wherein the number $N_2$ is $\geq 1.5 \times N_1$.

17. A turbomachine having a compressor as claimed in claim 16.

* * * * *